April 11, 1933.   J. E. FURTNEY   1,903,448
BATTERY
Filed March 5, 1929
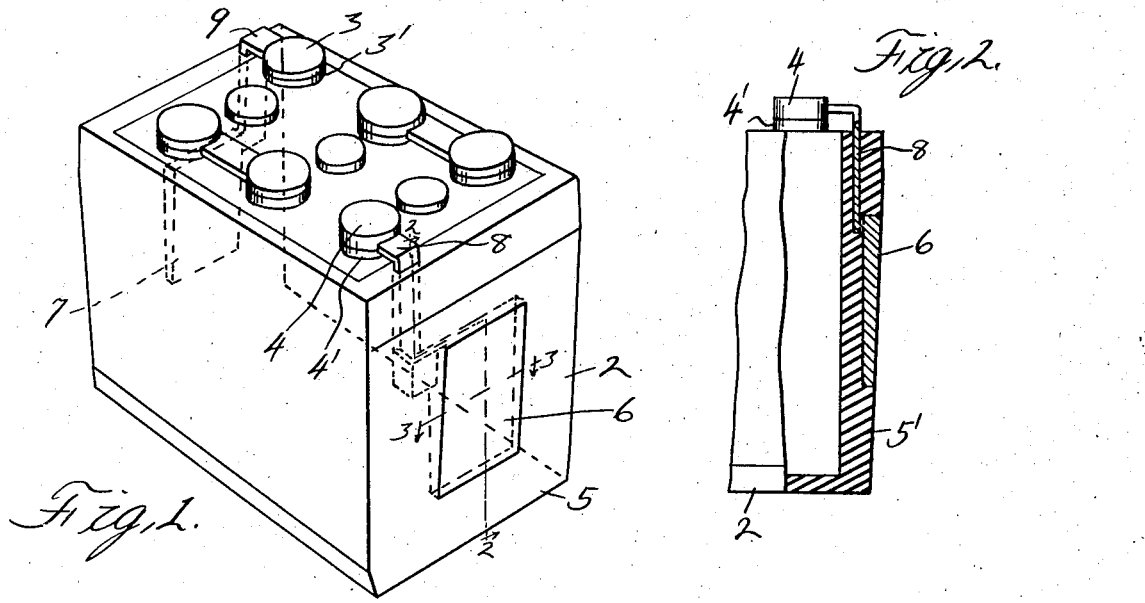
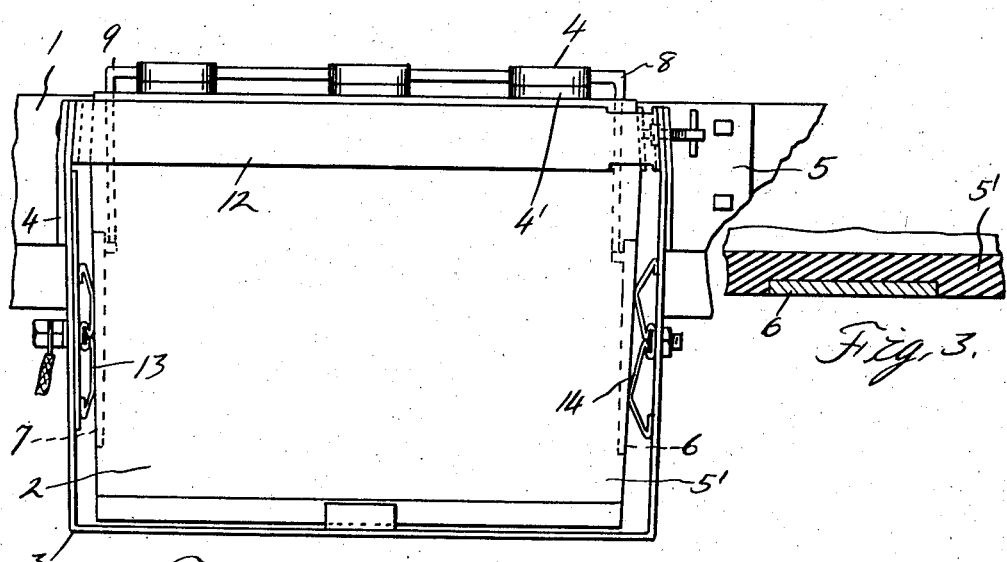
INVENTOR
John E. Furtney
BY
ATTORNEYS Patented Apr. 11, 1933

1,903,448

UNITED STATES PATENT OFFICE

JOHN E. FURTNEY, OF DETROIT, MICHIGAN

BATTERY

Application filed March 5, 1929. Serial No. 344,404.

This invention relates generally to storage batteries, particularly to those designed for use in connection with motor vehicles and the like and consists of certain novel features of construction, combinations and arrangements of parts that will be hereinafter more fully described and particularly pointed out in the appended claims.

In the accompanying drawing—

Figure 1 is a perspective view of a battery embodying my invention,

Figure 2 is a sectional view taken on the line 2—2 of Figure 1,

Figure 3 is a horizontal sectional view taken on the line 3—3 of Figure 1,

Figure 4 is a view of the battery mounted in a suitable carrier.

Referring now to the drawing, 1 is a chassis sill member of a motor vehicle, 2 is a storage battery embodying my invention, and 3 is a carrier for the storage battery supported by brackets 4 and 5 respectively at one side of the sill member 1.

As shown, the battery 2 has the usual electrical terminals 3 and 4 respectively, but in the present instance the plugs 3' and 4' for the terminals are rigidly secured to the battery casing 5'. Preferably this casing is formed of non-conducting or insulating material, and the plugs are embedded in and rise above said casing. Lead plates 6 and 7 respectively are embedded in the casing 5 at opposite ends of the battery and are electrically connected to the terminals 3 and 4 by means of lead straps 8 and 9. Preferably these straps project laterally from the terminals 3 and 4, are embedded in the casing 5 and are connected to the plates 6 and 7 at their upper ends, said connections being also embedded in the casing 5. As shown, the end walls of the casing 5 taper downwardly and the outer faces of the plates 6 and 7 also incline downwardly and inwardly so that the said outer faces of the plates are substantially flush with the outer faces of the end walls of the casing, as clearly illustrated in Figure 2 of the drawing.

In use, the battery 2 may be readily placed in the carrier 3 and when therein the straps 8 and 9 constituting the electrical connections between the terminals 3 and 4 and the plates 6 and 7 are insulated from the frame 12 of the carrier 3. Thus, the time required for removing or installing a battery such as 2 has been reduced materially since the electrical connections between the plates 6 and 7 of the battery and the terminals 13 and 14 on the carrier is effected automatically when the battery is inserted in the carrier. Moreover, since the terminal plugs 3 and 4 are rigid with the casing 5, the battery posts (not shown) are not loosened, acid is not spilled, and corrosion has been eliminated. Furthermore, a saving in the cost of manufacturing such batteries has been effected since the usual ground strap, battery hold downs and associated bolts have been dispensed with entirely. With the present construction the straps 8 and 9 are formed of lead whereas heretofore the take-offs have been of brass, therefore, a further saving in the cost of manufacturing such devices has been effected.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In combination, a battery casing of insulating material having substantially parallel top and bottom walls and having end walls extending between said top and bottom walls, the outer faces of said end walls inclining inwardly from points adjacent the top wall to the bottom wall, terminal plugs on the top wall, electrical contact plates wholly embedded in said side walls with their outer faces flush with the inwardly inclined outer faces of said end walls, and connections between said plates and plugs including straps embedded in the end walls and rising above the top wall, the connections between said straps and plates being embedded within said end walls.

2. In combination, a battery casing of insulating material having a top wall and having end walls provided with downwardly and inwardly inclined outer faces, terminal plugs embedded in and rising above the top wall, electrical contact plates wholly embedded within said end walls in spaced relation to said top wall and having their outer faces substantially flush with the inclined faces of the end walls, and straps embedded in the end walls and terminally secured to said plugs and plates.

In testimony whereof I affix my signature.

JOHN E. FURTNEY.